United States Patent
Sasaoka

(10) Patent No.: US 7,523,600 B2
(45) Date of Patent: Apr. 28, 2009

(54) LAWN MOWER HANDLE DRIVE OPERATING MECHANISM

(75) Inventor: Masayuki Sasaoka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/751,862

(22) Filed: May 22, 2007

(65) Prior Publication Data
US 2007/0271892 A1 Nov. 29, 2007

(30) Foreign Application Priority Data
May 24, 2006 (JP) .............................. 2006-144083

(51) Int. Cl.
*A01D 75/28* (2006.01)
(52) U.S. Cl. ...................... 56/10.5; 180/19.3
(58) Field of Classification Search ............. 74/483 PB, 74/483 K, 483 R, 473.31; 180/19.1, 19.3, 180/315, 6.48; 280/298; 56/11.3, 11.8, 11.4, 56/DIG. 18, 10.5, 10.1
See application file for complete search history.

(56) References Cited

U.S. PATENT DOCUMENTS

| | | | | |
|---|---|---|---|---|
| 4,295,327 A | * | 10/1981 | Bortolussi .................... | 56/11.3 |
| 4,321,784 A | * | 3/1982 | Wood et al. .................. | 56/17.2 |
| 4,333,302 A | * | 6/1982 | Thomas et al. ............... | 56/10.5 |
| D295,865 S | * | 5/1988 | Rosenblad ................... | D15/18 |
| 5,146,735 A | * | 9/1992 | McDonner ................... | 56/11.3 |
| 5,155,985 A | * | 10/1992 | Oshima et al. ............... | 56/10.8 |
| 5,261,140 A | * | 11/1993 | Szymanski .................. | 15/50.1 |
| 5,279,101 A | * | 1/1994 | Sueshige ..................... | 56/11.5 |
| 5,316,097 A | * | 5/1994 | Meyer et al. ................ | 180/19.1 |
| 5,355,662 A | * | 10/1994 | Schmidt ...................... | 56/11.3 |
| 5,375,674 A | * | 12/1994 | Peter ........................... | 180/19.3 |

(Continued)

FOREIGN PATENT DOCUMENTS

EP 0047416 A1 3/1982

(Continued)

OTHER PUBLICATIONS

European Search Report for EP 07 01 0389 mail on Jul. 27, 2007.

(Continued)

*Primary Examiner*—Árpád Fábián-Kovács
(74) *Attorney, Agent, or Firm*—Westerman, Hattori, Daniels & Adrian, LLP.

(57) ABSTRACT

A lawn mower, which is driven by an electric motor or an internal combustion engine, has an operation handle 80, which is formed by connecting through a grip part 82 rear ends of left and right long handgrips 81L, 81R extending rearward from the body of the lawn mower supported by wheels 6 and 7. A first operation member 84 is provided near a central portion of the grip part 82 of the operation handle 80, and a second operation member 85 is swingably supported by the operation handle 80. The second operation member 85 is arranged on the front side of the grip part 82 so as to freely move to and from the grip part 82. The lawn mower is driven by sequential operation of the first and second operation members 84, 85. Thus it is possible to constantly keep the lawn mower stable, enabling easy and quick operation, and improving operability.

6 Claims, 12 Drawing Sheets

U.S. PATENT DOCUMENTS

| | | | |
|---|---|---|---|
| 5,488,818 A | | 2/1996 | Powers et al. |
| 5,651,241 A | * | 7/1997 | Wegner ................. 56/11.2 |
| 5,803,847 A | * | 9/1998 | Kamm ................... 474/37 |
| 5,806,374 A | | 9/1998 | Mizutani et al. |
| 6,082,083 A | * | 7/2000 | Stalpes et al. ........... 56/11.6 |
| 6,098,385 A | * | 8/2000 | Turk ..................... 56/11.3 |
| 6,105,348 A | * | 8/2000 | Turk et al. ............. 56/10.5 |
| 6,341,479 B1 | * | 1/2002 | Scag et al. ............. 56/11.3 |
| 6,499,236 B2 | * | 12/2002 | Yoshida et al. .......... 37/219 |
| 6,516,596 B2 | * | 2/2003 | Velke et al. ............ 56/14.7 |
| 6,640,526 B2 | * | 11/2003 | Velke et al. ............ 56/10.8 |
| 6,644,002 B2 | * | 11/2003 | Trefz ................... 56/10.8 |
| 6,658,829 B2 | * | 12/2003 | Kobayashi et al. ....... 56/10.5 |
| 6,945,133 B2 | * | 9/2005 | Rush et al. ............. 74/501.5 R |
| 6,951,092 B2 | * | 10/2005 | Busboom et al. ......... 56/10.8 |
| 7,293,397 B2 | * | 11/2007 | Osborne ................ 56/10.8 |
| 2002/0026779 A1 | | 3/2002 | Velke et al. |
| 2004/0152546 A1 | * | 8/2004 | Johnson et al. .......... 474/33 |

FOREIGN PATENT DOCUMENTS

| | | |
|---|---|---|
| EP | 1702504 A | 9/2006 |
| GB | 1401136 A | 7/1975 |
| JP | 09252626 A | 9/1997 |

OTHER PUBLICATIONS

European Office Action dated Apr. 4, 2008, Application No. 07010389.0-1260.

* cited by examiner

LAWN MOWER HANDLE DRIVE OPERATING MECHANISM

BACKGROUND OF THE INVENTION

1. Field of the Invention

The present invention relates to an operating mechanism that is used to control the operation of a lawn mower when the operator operates a lawn mower driven by an electric motor or an internal combustion engine.

2. Description of the Related Art

The body of a lawn mower, which includes blades for cutting lawn and an electric motor or an internal combustion engine for driving the blades, is supported by wheels. Accordingly, the lawn mower can travel. An operation handle, which is used to control the body of the lawn mower, extends rearward from the body of the lawn mower. The operation handle is provided with a drive-operating mechanism for controlling the operation of the lawn mower.

The lawn mower is configured in such a manner that when the blades are driven in the lawn mower, two kinds of successive operations should be performed to prevent careless operation of the blades. For this reason, an operation handle is provided with first and second operation members (for example, refer to JP-A-9-252626).

According to the lawn mower disclosed in JP-A-9-252626, an operation handle provided in the body of the lawn mower is formed by connecting through a grip part rear ends of left and right long handgrips, which extend rearward from left and right sides of the body of the lawn mower.

An operating switch case is provided in the right long handgrip of the operation handle, and a push button as an operation member is provided on the left surface of the operating switch case. A lever as another operation member is provided on the front side of the grip part so as to be movable toward and away from the grip part.

The lever is supported on the left and right long handgrips by using bearing portions so as to swing forward and rearward. When swinging forward and rearward, the lever can be separated from and approach the grip part. When a right bearing portion is positioned in the operating switch case and the push button is depressed, the lever is grasped together with the grip part and swings rearward. As a result, a micro switch provided in the operating switch case is turned on and the lawn mower is thus driven.

Therefore, at the time of driving the lawn mower, the operator normally grasps the grip part of the operation handle with the left hand and stretches out the right hand to depress the push button, which is provided on the left surface of the operating switch case provided in the right long handgrip. Then, the operator returns his right hand to the grip part and then grasps the lever and the grip part with both hands.

After starting the lawn mower, the operator grasps the lever and the grip part with both hands and operates the lawn mower. Accordingly, the operator must operate the lawn mower while moving his right hand forward and rearward. For this reason, it is difficult for the operator to sequentially and quickly perform two kinds of troublesome operation. As a result, it is not possible to obtain excellent operability.

Further, if the operator operates the lever only with his left hand directly after stretching out his right hand and depressing the push button, it is possible for him to quickly perform two kinds of operation. However, directly after the law mower is started, the operator grasps the operation lever only with his left hand and must retain the lawn mower. For this reason, it is not possible for the operator to keep the lawn mower stable.

In addition, since the push button is provided on the left surface of the operating switch case provided in the right long handgrip, it is difficult for the operator to quickly operate the lawn mower since the operator is at the rear side of the grip part of the operation handle and has a difficulty in seeing the push button.

SUMMARY OF THE INVENTION

The invention has been made to solve the above problems, and it is an object of the invention to provide a drive-operating mechanism for a lawn mower, which constantly keeps the lawn mower stable and enables the operator to easily perform a quick operation, with improved operability.

In order to achieve the object, the present invention provides a drive-operating mechanism for a lawn mower having a body and an operation handle and driven by one of an electric motor and an internal combustion engine, the body of the lawn mower being supported by wheels, and the operation handle including left and right long handgrips extending rearward from the body of the lawn mower, and a grip part connecting rear ends of left and right long handgrips, wherein the drive-operating mechanism comprises: a first operation member provided near a central portion of the grip part of the operation handle; and a second operation member swingably supported by the operation handle and provided on a front side of the grip part so as to be movable toward and away from the grip part; the first and second operation members being adapted for sequential operation to drive the lawn mower.

According to the drive-operating mechanism for the lawn mower, the first operation member is provided near a central portion of the grip part of the operation handle and the second operation member is swingably provided on the front side of the grip part so as to be movable toward and away from the grip part. For this reason, while grasping the grip part of the operation handle with both hands, the operator can operates the first operation member provided near the central portion of the grip part. Further, the operator can grasp the second operation member provided on the front side of the grip part together with the grip part to operate the lawn mower. In addition, while grasping the grip part of the operation handle with both hands, the operator can sequentially operate the first and second operation members to drive the lawn mower.

Further, the operator can grasp the grip part of the operation handle with both hands to operate the lawn mower. Accordingly, it is possible for the operator to easily operate the lawn mower and to obtain excellent operability. Further, it is possible for the operator to constantly keep the lawn mower stable even in the starting period of the lawn mower. Further, since the first operation member is provided near the central portion of the grip part of the operation handle, it is possible to obtain excellent operator's visibility and to quickly perform operation while grasping the grip part.

The drive-operating mechanism for the lawn mower according to the invention may further include left and right travel levers adjacent to left and right sides of the first operation member. The left and right travel levers may be provided on the rear side of the grip part so as to be movable toward and away from the grip part.

According to the above-mentioned drive-operating mechanism, the left and right travel levers are provided close to left and right sides of the first operation member, and provided on the rear side of the grip part so as to be movable to and from the grip part. Accordingly, while grasping the grip part of the operation handle with both hands, the operator can operate at least one of the left and right travel levers. Further, the operator can grasp and operate one of the left and right travel levers together with the grip part. Accordingly, while keeping the lawn mower stable, it is possible to carry out the travel operation and to obtain excellent operability.

DESCRIPTION OF THE PREFERRED EMBODIMENTS

An embodiment of the invention will be described below with reference to FIGS. 1 to 12.

A working machine according to this embodiment is a lawn mower 1. That is, the working machine is a hybrid self-propelled lawn mower that can rotate mowing blades 12 (see FIG. 2) by a four-stroke cycle internal combustion engine 10 to perform a mowing operation and can travel for oneself by a travel DC motor 30.

Figure 1:
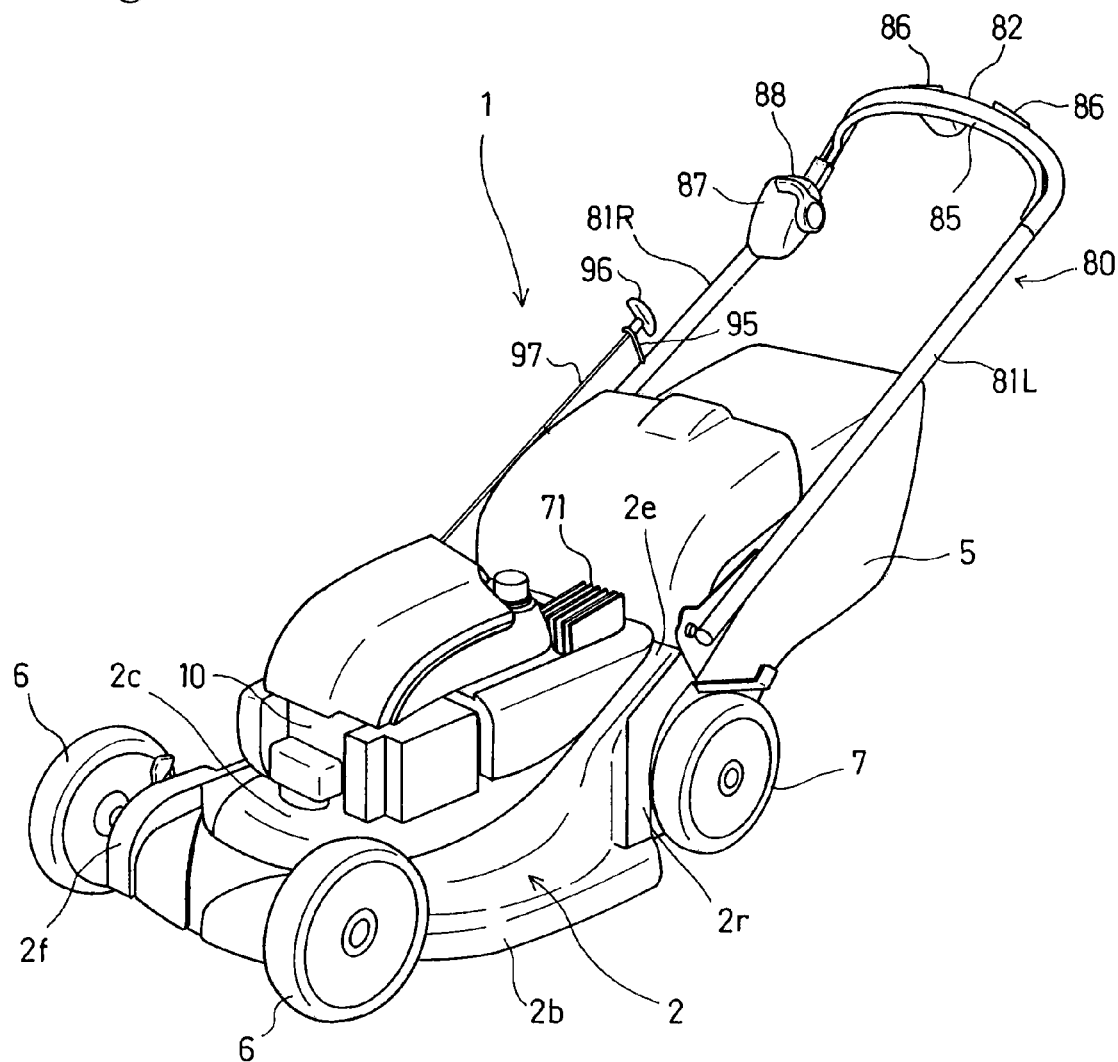
FIG. 1 is a perspective view showing an entire lawn mower to which a drive-operating mechanism according to the invention is applied.
Figure 2:
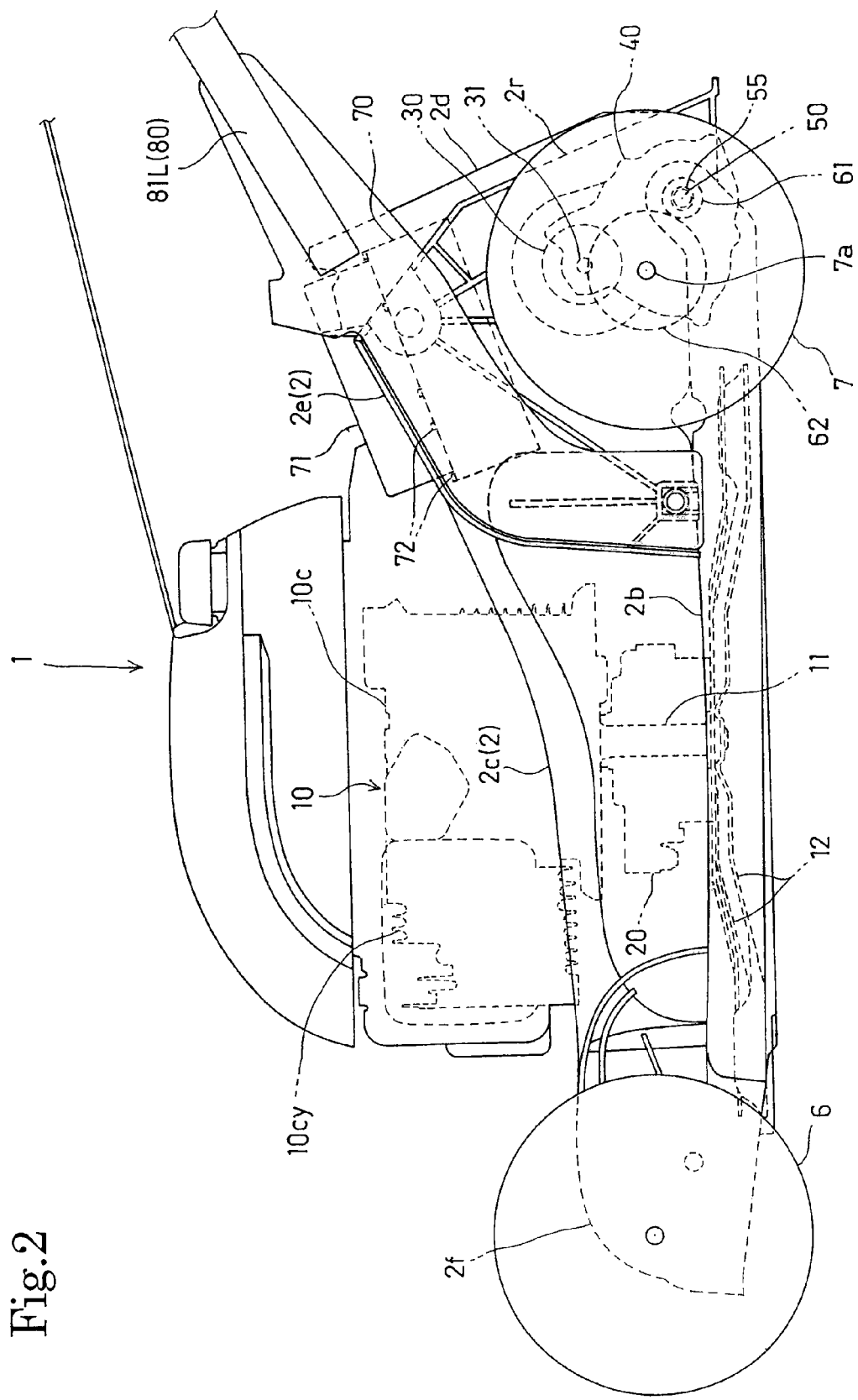
FIG. 2 is a side view of a body of the lawn mower.
Figure 3:
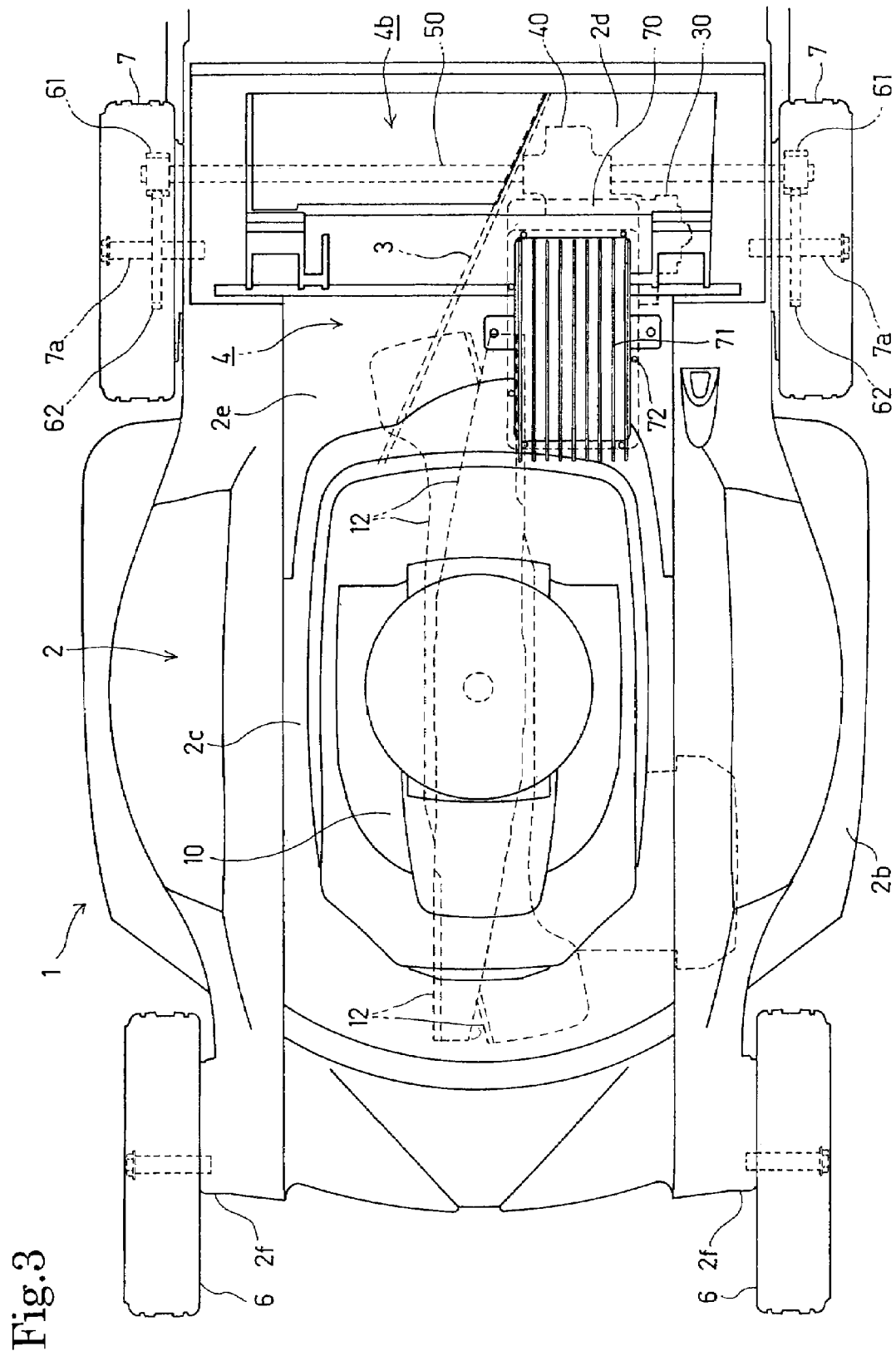
FIG. 3 is a plan view of the body of the lawn mower.
Figure 4:
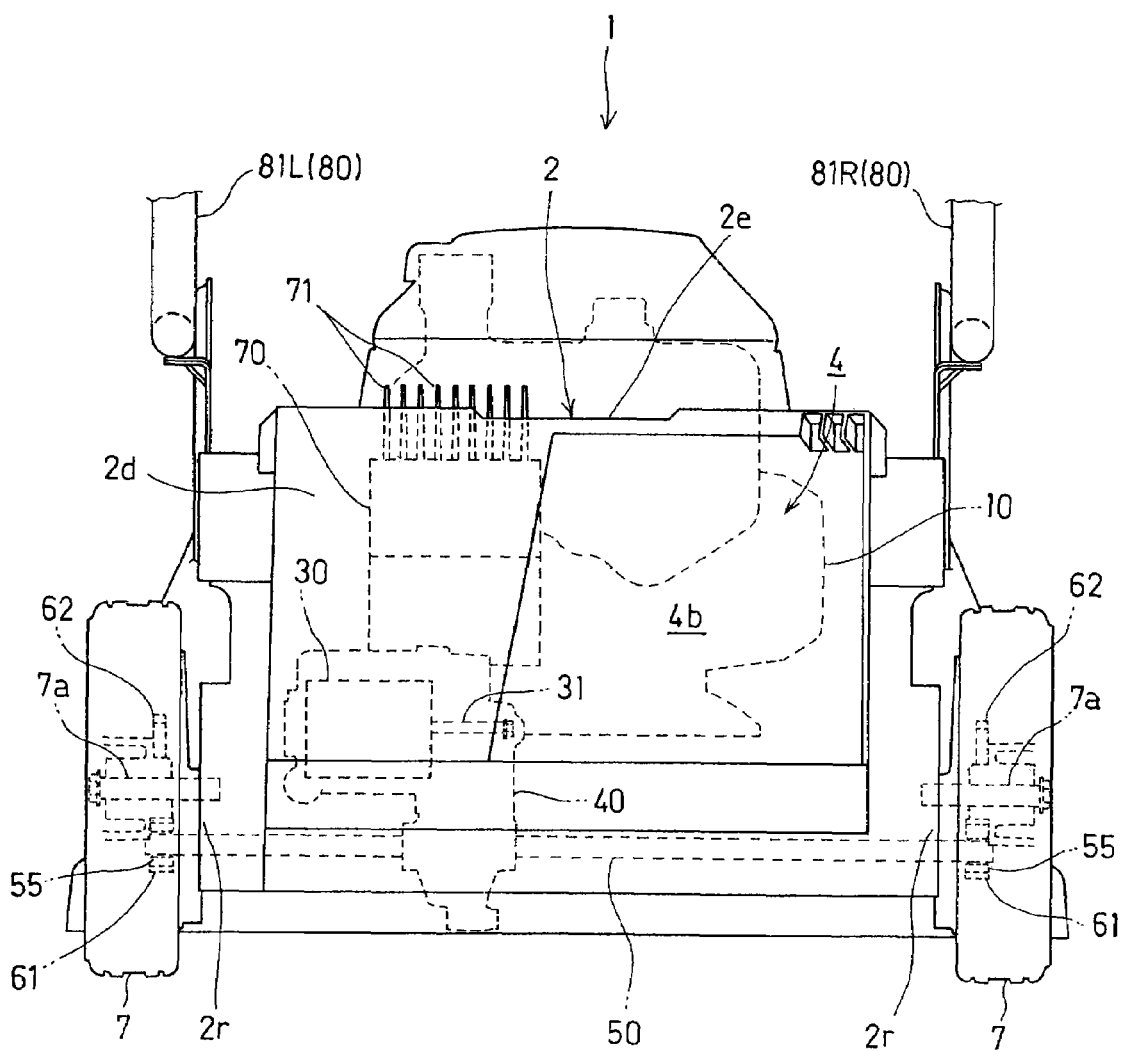
FIG. 4 is a rear view of the body of the lawn mower.

FIG. 1 shows a perspective view showing the entire lawn mower 1, FIG. 2 shows a side view of a body of the lawn mower, FIG. 3 is a plan view of the body of the lawn mower, and FIG. 4 is a rear view of the body of the lawn mower.

Referring to FIG. 1, a blade housing 2, which supports the mowing blades 12 (see FIG. 2) rotating above the ground and covers the blades from above, is supported by a pair of (left and right) front wheels 6 and 6 and rear wheels 7 and 7 so as to freely travel on the ground.

A direction in which the lawn mower 1 moves forward will be referred as a forward direction in the description, and the front, the rear, the left, and the right are determined on the basis of the above-mentioned direction.

Bearing portions 2f, 2f, 2r, and 2r, which support four shafts of the front and rear wheels 6, 6, 7, and 7, are provided at four corners of the blade housing 2. Further, the lower portion of a central portion 2c, which is surrounded by the bearing portions 2f, 2f, 2r, and 2r, of the blade housing 2 is formed to have the shape of a flat bowl, thereby forming a blade receiving portion 2b covering the blades 12. The rear half portion of the central portion 2c is expanded upward toward the rear side thereof, thereby forming an expansion portion 2e that is continuous to the rear side and expanded upward.

An internal combustion engine 10 is provided in the central portion 2c of the blade housing 2 so that a crankshaft 11 (see FIG. 2) is oriented in a vertical direction. In the internal combustion engine 10, cylinders 10cy are oriented toward the front side, and the crankshaft 11 protrudes downward from within a crank case 10c.

Figure 5:
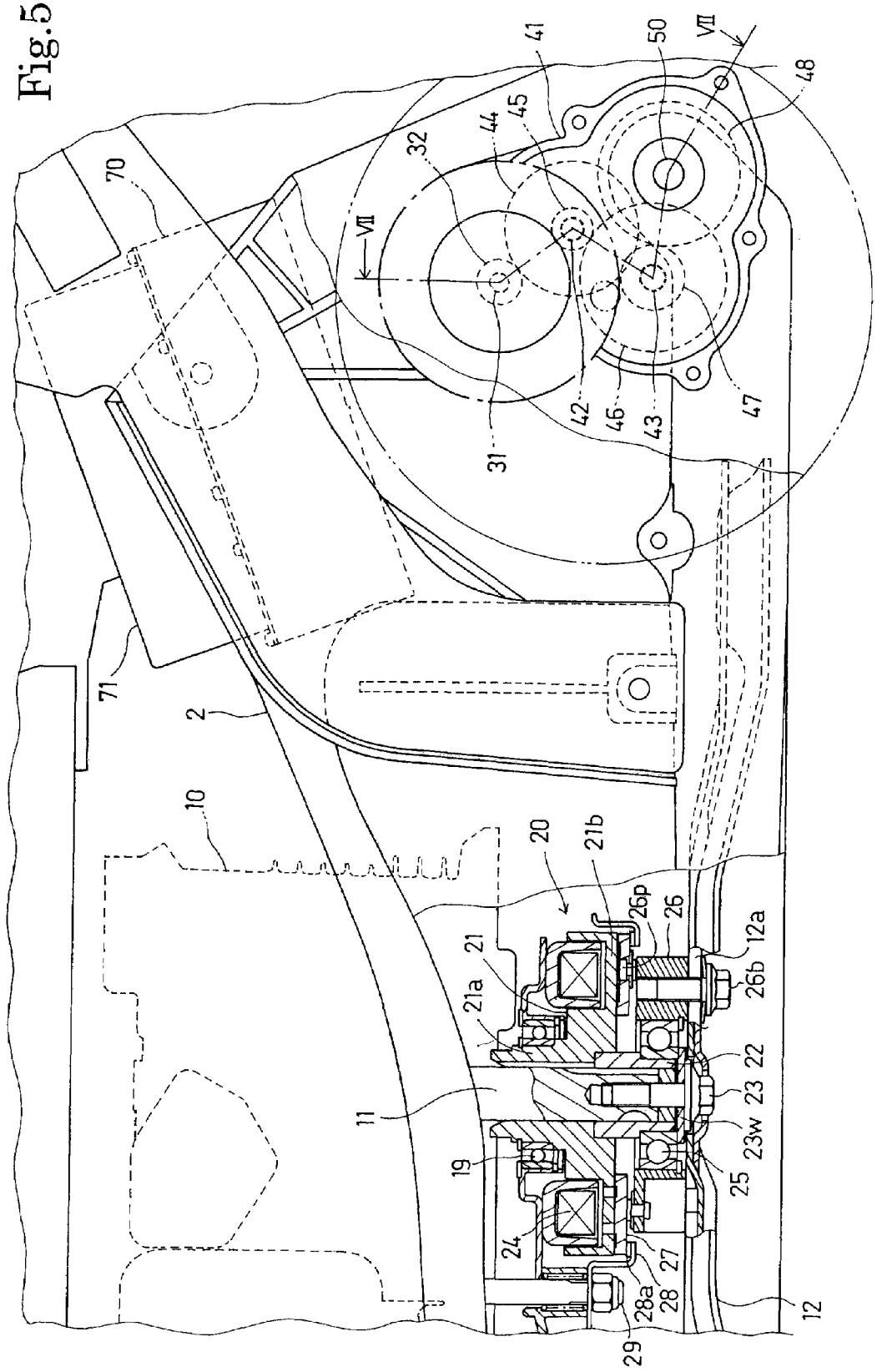
FIG. 5 is a side view, partly in section, of the lawn mower in which a part of the lawn mower is omitted.

As shown in FIG. 5, an electromagnetic clutch 20 is provided between the crankshaft 11 and the blades 12. Accordingly, if the electromagnetic clutch 20 is engaged during the operation of the internal combustion engine 10, the blades 12 are rotated. As a result, it is possible to perform the mowing operation.

A vertical partition plate 3 (see FIG. 3) is obliquely provided throughout from the right side of the central portion 2c to the expansion portion 2e at the posterior half of the blade housing 2. Further, the inside of the blade housing 2 is partitioned by the vertical partition plate 3, so that a lawn conveying passage 4 is formed.

The lawn conveying passage 4 is a passage, which is formed by partitioning the inside of the blade housing 2. The front end of the passage is opened to the blade receiving portion 2b, and the cross-sectional area of the passage is gradually increased from a front opening toward the rear side thereof. For this reason, a large rear opening 4b (see FIGS. 3 and 4) is formed in the rear wall, which is slightly inclined, of the expansion portion 2e.

The rear opening 4b of the lawn conveying passage 4 is largely opened to occupy an area larger than the right half portion of the rear wall 2d of the expansion portion 2e, and the front opening is connected to the rear opening 4b. A lawn collecting bag 5 shown in FIG. 1 is connected to the rear opening 4b to extend toward the rear.

The inside of the blade housing 2 is partitioned by the inclined vertical partition plate 3, so that the lawn conveying passage 4 is formed at the right portion in the blade housing. Further, a travel DC motor 30 and a speed reduction mechanism 40 are provided in a lower half of a left-side space, which is partitioned by the vertical partition plate 3.

As shown in FIG. 4, a motor driving shaft 31 of the travel DC motor 30 is disposed in the upper portion of the speed reduction mechanism 40, as an input shaft of the speed reduction mechanism 40. Further, the torque of the motor driving shaft 31 is transmitted to a driving shaft 50, which serves as an output shaft provided in the lower portion of the speed reduction mechanism 40, through the engagement of reduction gears at a reduced speed.

Figure 6:
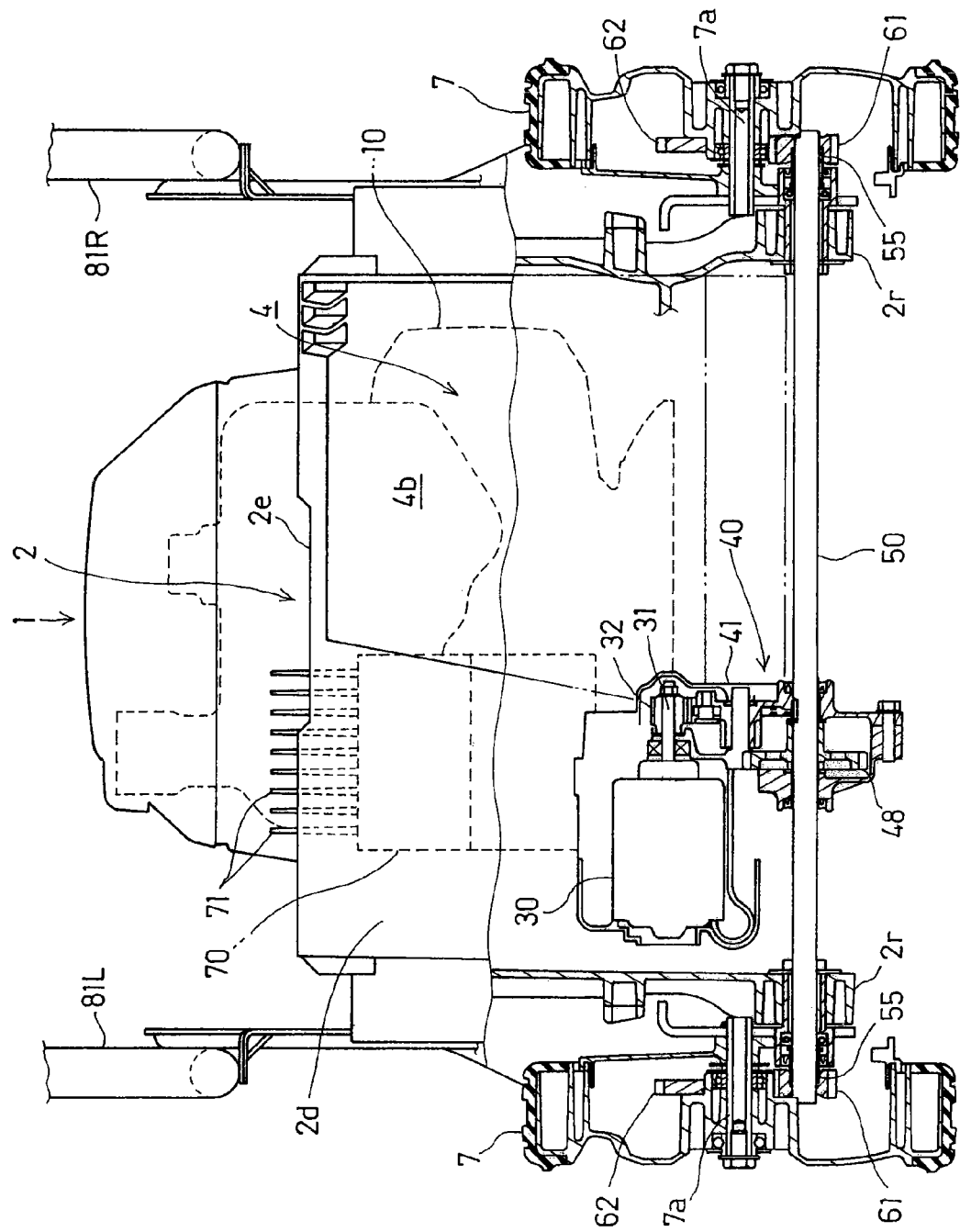
FIG. 6 is a rear view, partly in section, of the lawn mower in which a part of the lawn mower is omitted.

As shown in FIGS. 4 and 6, the driving shaft 50 extends in the left-and-right or transverse direction and is rotatably provided on the rear side of rear axles 7a and 7a by which the rear wheels 7 and 7 are rotatably supported. Further, driving gears 61 and 61, which are fitted to both ends of the driving shaft 50 with two-way or bi-directional clutches 55 interposed therebetween, are engaged with driven gears 62 and 62, which are integrally fixed to the rear wheels 7 and 7.

Accordingly, the torque of the motor driving shaft 31 of the travel DC motor 30 is transmitted to the driving shaft 50 through the speed reduction mechanism 40 at a reduced speed, and the torque of the driving shaft 50 is transmitted to the rear wheels 7 and 7 through the two-way or bi-directional clutches 55 and the engagement between the driving and driven gears 61, 61, 62, and 62. Therefore, the lawn mower 1 travels.

The bi-directional clutch is a clutch in which only forward directional power of the driving shaft of a driving source is transmitted to the driving wheel while the forward and backward torques of the driving wheel are not transmitted to the driving shaft if the clutch is not engaged and in a disengaged state.

The drive control of the travel DC motor 30, the operation control of the internal combustion engine 10, and the engagement or disengagement control of the electromagnetic clutch 20, which transmits the power of the internal combustion engine 10 to the blades 12, are performed by an ECU 70 (see FIGS. 2 and 4), which is an electronic control unit using a computer.

The ECU 70 is provided in an upper half of the left space of the lawn conveying passage 4, which left space is partitioned by the vertical partition plate 3 at the upper portion of the rear expansion portion 2e of the blade housing 2. The travel DC motor 30 is provided on the lower side of the ECU 70. The ECU 70 is received in a case having a rectangular parallelepiped shape, and a plurality of cooling fins 71 protrude in line from the upper surface of the case.

An inclined upper wall of the rear expansion portion 2e of the blade housing 2 is partially opened so that a rectangular opening is formed, and the rectangular opening is slightly smaller than the rectangular upper surface of the case of the ECU 70. As shown in FIG. 3, the cooling fins 71 are inserted into the rectangular opening from below so as to be exposed to the upper side. Further, the outer edges of the upper surface of the case of the ECU 70 come in contact with the edges of the rectangular opening, and are fixed to the edges of the rectangular opening with screws 72. Accordingly, the ECU 70 is supported on the upper wall of the blade housing 2.

Figure 7:
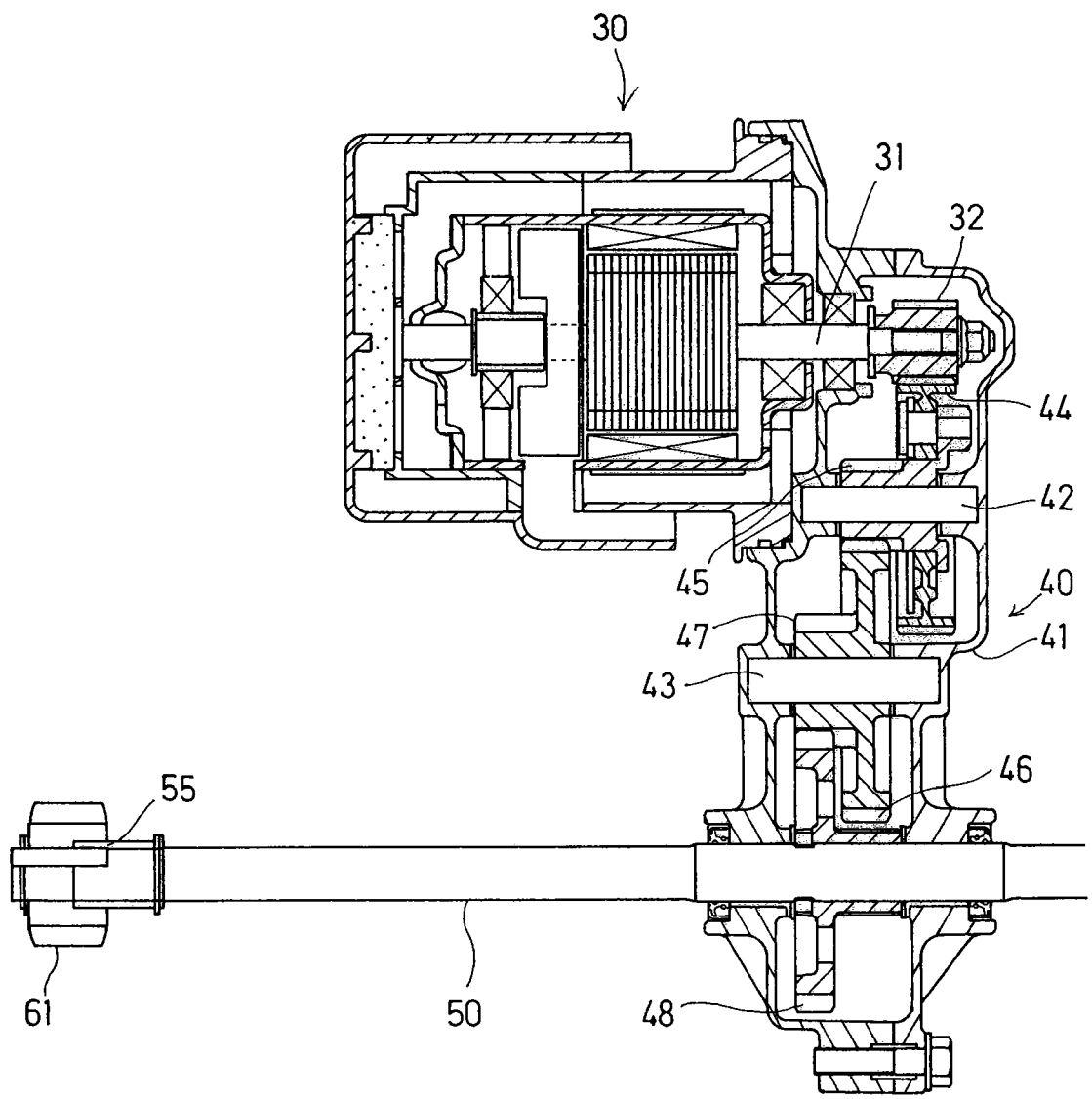
FIG. 7 is a sectional view of a travel DC motor and a speed reduction mechanism, taken along line VII-VII of FIG. 5.

A power transmission system will be described below with reference to FIGS. 5 to 7.

First, the structure of the electromagnetic clutch 20, which transmits the power of the internal combustion engine 10 to the blade 12, will be described with reference to the sectional view of FIG. 5.

A rotary disk 21 is serration-fitted from below to the crankshaft 11, which protrudes downward from the internal combustion engine 10. In addition, a cylindrical collar 22 is fitted to the crankshaft 11 and then integrally fixed to the crankshaft 11 by using a flange bolt 23 with a washer 23w interposed therebetween. Accordingly, the crankshaft 11 and the rotary disk 21 rotate as a single body.

The rotary disk 21 is composed of a cylindrical portion 21a supported by a bearing 19 and a disk portion 22b formed at the lower end of the cylindrical portion. Furthers the upper portion of an annular electromagnetic coil 24 is held, so that an annular electromagnetic coil 24 is suspended close to the upper surface of the disk portion 21b.

An annular blade supporting member 26 is provided on the outer peripheral surface of the collar 22 with a bearing 25 interposed therebetween so as to freely rotate relative to the crankshaft 11. Further, an annular base end 12a of the blades 12 comes in contact with the lower surface of the annular supporting member 26, and integrally fixed to the lower surface with a flange bolt 26b. Therefore, the blades 12 are supported to freely rotate with respect to the crankshaft 11.

A hollow disk-shaped clutch disk 27 is supported on the blade supporting member 26 so as to move up and down. That is, a plurality of pins 26p, which stands on the upper surface of the blade supporting member 26, passes through the clutch disk 27. The clutch disk 27 moves up and down with respect to the blade supporting member 26, but has the structure in which the rotation of the clutch disk 27 with respect to the blade supporting member 26 is limited.

The clutch disk 27 is close to the disk portion 22b of the rotary disk 21 and faces the disk portion. When moved upward, the clutch disk 27 comes in contact with the disk portion 21b. A friction member is attached to the portion, which comes in contact with the disk portion 22b of the rotary disk 21, of the upper surface of the clutch disk 27.

Further, an annular locking plate 28, which is fixed to the blade housing 2 with a bolt 29, is supported below the outer edge of the lower surface of the clutch disk 27. Friction members 28a are attached in an annular shape on the upper surface of the annular locking plate 28.

The electromagnetic clutch 20 has the above-mentioned structure. When current is not supplied to the electromagnetic coil 24 and the electromagnetic coil is demagnetized, the clutch disk 27 moves downward to be separated from the rotary disk 21. For this reason, although the crankshaft 11 and the rotary disk 21 rotate due to the driving of the internal combustion engine 10, power is not transmitted to the blade supporting member 26 and the blades 12 thus do not rotate.

Meanwhile, when current is supplied to the electromagnetic coil 24 and the electromagnetic coil is energized, the clutch disk 27 moves upward to be attached to the rotary disk 21 due to the magnetic force. For this reason, the torque of the crankshaft 11 causes the rotary disk 21 and the clutch disk 27 to rotate as a single body, and the torque of the clutch disk 27 is transmitted to the blade supporting member 26 through the pins 26p. Therefore, the blades 12 rotate.

In this case, when the electromagnetic coil 24 is deenergized, the clutch disk 27 is separated from the rotary disk 21 and moves downward to be placed on the friction members 28a of the annular locking plate 28. For this reason, the rotation of the clutch disk 27 and the blade 12 is limited due to inertia, so that the clutch disk 27 and the blades 12 stop.

Next, a travel driving system using the travel DC motor 30 will be described with reference to FIGS. 5 to 10.

As described above, the travel DC motor 30 and the speed reduction mechanism 40 are provided in the lower half of the left space, which is partitioned by the vertical partition plate 3, in the rear expansion portion 2e of the blade housing 2. Further, as shown in FIG. 7, the motor driving shaft 31 protruding from the right side of the travel DC motor 30 is inserted into the upper portion of a reduction gear case 41, and a motor driving gear 32 is fitted to the end of the motor driving shaft 31.

The driving shaft 50 passes through the lower portion of the reduction gear case 41 in a right-and-left or transverse direction. Further, two gear shafts 42 and 43 are provided between the motor driving shaft 31 and the driving shaft 50 in the reduction gear case 41. The gear shafts 42 and 43 are oriented in the right-and-left direction.

A large diameter gear 44, which is integrally fitted to a small diameter gear 45 rotatably supported by the gear shaft 42, is engaged with the driving gear 32.

A large diameter gear 46 and a small diameter 47, which are integrally formed with each other, are rotatably supported by the gear shaft 43. Further, the large diameter gear 46 is engaged with the small diameter gear 45, and the small diameter 47 is engaged with the large diameter gear 48 fitted to the driving gear 50.

The speed reduction mechanism 40 has the above-mentioned structure. The torque of the motor driving shaft 31 is transmitted to the driving shaft 50 at a reduced speed through the engagement of gears provided between the small diameter gear and the large gear.

The driving gears 61 and 61 are fitted to the both ends of the driving shaft 50 with the two-way or bi-directional clutches 55 and 55 interposed therebetween, and the driving gears 61 and 61 are engaged with the driven gears 62 and 62, which are integrally fixed to the rear wheels 7 and 7, respectively.

Accordingly, the bi-directional clutches 55 and 55 are engaged due to the driving of the travel DC motor 30, so that the rear wheels 7 and 7 rotate. As a result, the lawn mower 1 can travel.

If the travel DC motor 30 is stopped (with short-circuit) while stop electric power is being supplied to the motor, the two-way or bi-directional clutches 55 and 55 are retained in the disengagement state. If the bi-directional clutches 55 and 55 are in the disengagement state, the forward and backward (bi-directional) torque of the driving wheels 7 is not transmitted to the driving shaft 50. For this reason, the operator can easily push and pull the lawn mower 1 and easily change the direction of the lawn mower.

In the body of the lawn mower 1 having the above-mentioned structure, an operation handle 80 extends rearward from the upper portion of the rear expansion portion 2e of the blade housing 2.

The operation handle 80 is a member, which is obtained by bending a tubular member in a U shape. Left and right long handgrips 81L and 81R extend rearward in an obliquely upwardly sloping manner from the left and right sides of the rear expansion portion 2e of the blade housing 2, and the rear ends of the handgrips 81L and 81R are connected with each other through a grip part 82, thereby forming the operation handle 80.

The operation handle 80 is provided with various operation members, which are operated by the operator.

Figure 8:
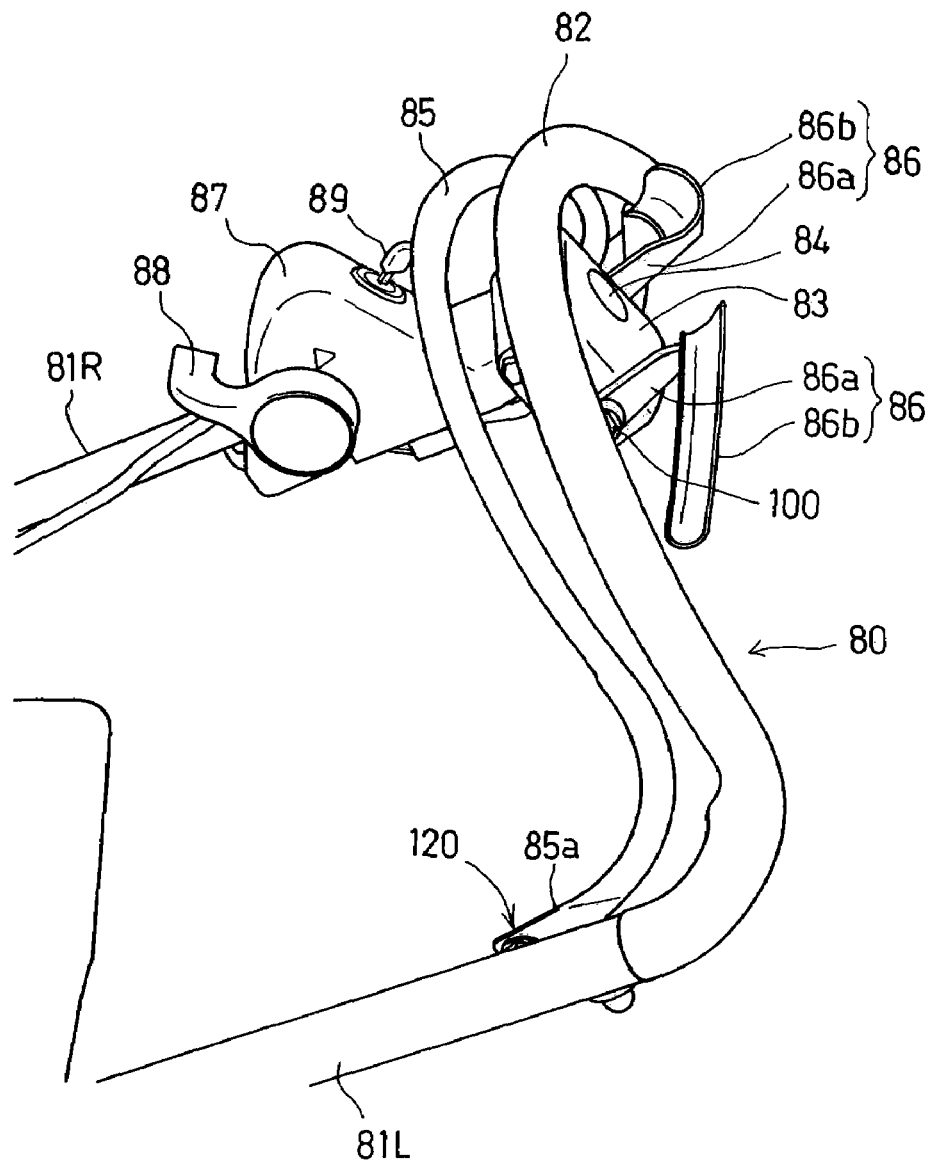
FIG. 8 is a perspective view showing the structure near a grip part of an operation handle.

Referring to FIG. 8, a first operating switch case 83 having a rectangular parallelepiped shape is fixed to a central portion of the grip part 82, which is convexly bent upward, so as to depend downward from the central portion of the grip part. A push button 84 as a first operation member is provided on a rear surface of the first operating switch case 83.

A blade lever 85 as a second operation member is provided on the front side of the bent grip part 82 so as to be movable toward and away from the grip part 82.

A swing central shaft 100 passes through right and left sidewalls of the first operating switch case 83. The swing central shaft 100 has both ends thereof protruding outward. Base ends of left and right travel levers 86 and 86 are fitted to the both ends of the swing central shaft 100. Therefore, the left and right travel levers 86 and 86 can swing toward the rear side of the grip part 82.

Figure 10:
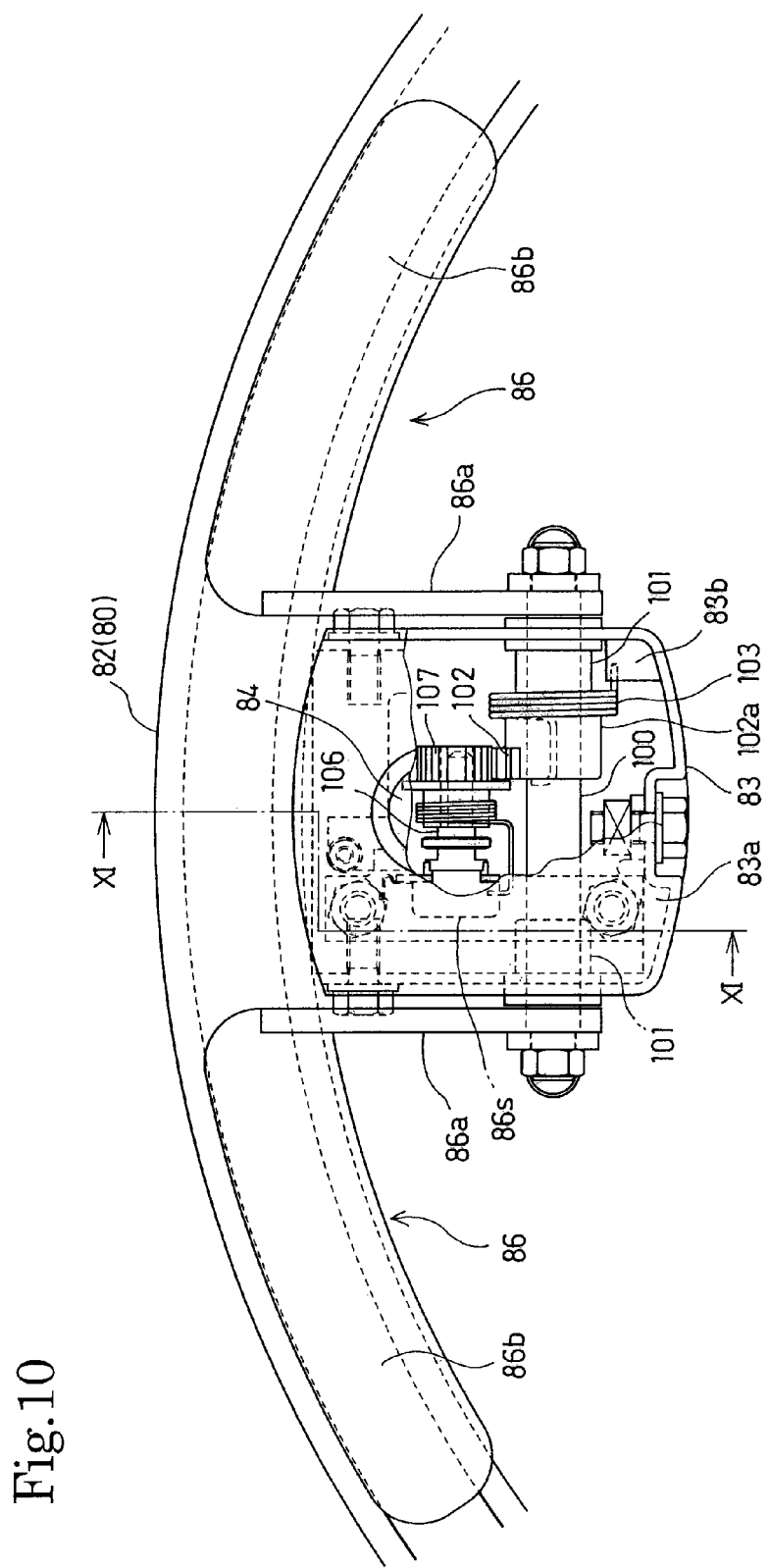
FIG. 10 is a rear view of a first operating switch case of a central portion of a grip part of an operation handle and the structure near the first operating switch case.

As shown in FIG. 10, each of the travel lever 86 is composed of a swing arm 86a of which base end is fitted to the swing central shaft 100, and an operation portion 86b bent to the right or left from the end of the swing arm 86a.

When the left and right travel levers 86 and 86 swing forward, the operation portions 86b and 86b come into contact with the grip part 82. When the left and right travel levers swing rearward, the operation portions 86a are separated from the grip part 82.

Each of the operation portion 86b has a circular arc shape in cross-section and has the same shape as the grip part 82 so as to be fittable on the outer peripheral surface of the circular-tube-shaped grip part 82.

Figure 12:
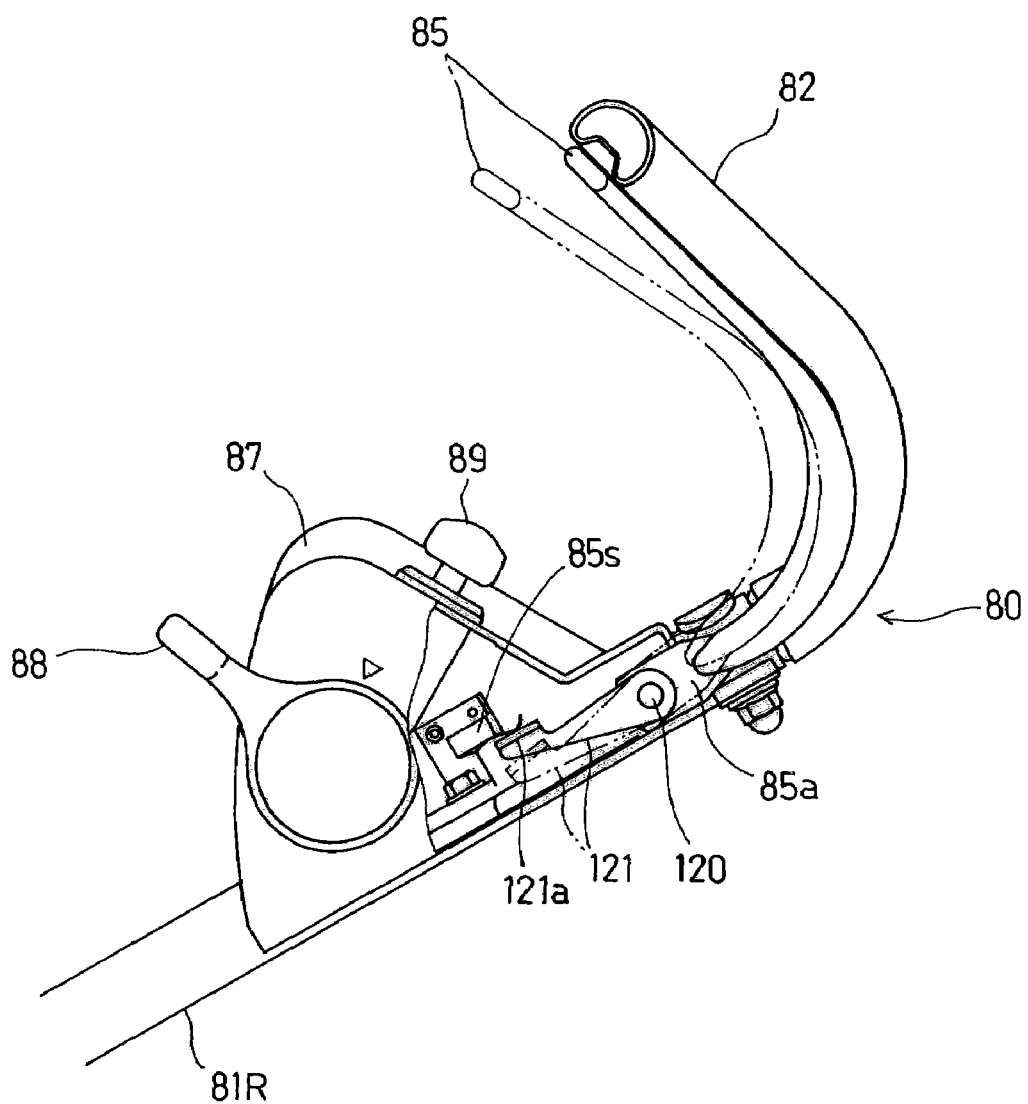
FIG. 12 is a left side view of a second operating switch case of a right long handgrip of the operation handle and the structure near the second operating switch case.

As shown in FIG. 12, a second operating switch case 87 is attached to the inner portion of the right long handgrip 81R at a position near the grip part 82. Furthermore, a speed control lever 88 is provided on the left side surface of the second operating switch case 87, which has a triangular shape in side view. The speed control lever 88 is able to swing forward and rearward.

In addition, an ignition knob 89 is rotatably provided on the rear surface (facing the operator) of the second operating switch case 87.

Further, as shown in FIG. 1, a starting grip 96 is supported by a grip receiver 95, which protrudes upward from the right long handgrip 81R. A starting cable 97 extends forward from the starting grip 96, and is connected to a recoil starter (not shown) provided on the upper portion of the internal combustion engine 10.

Figure 9:
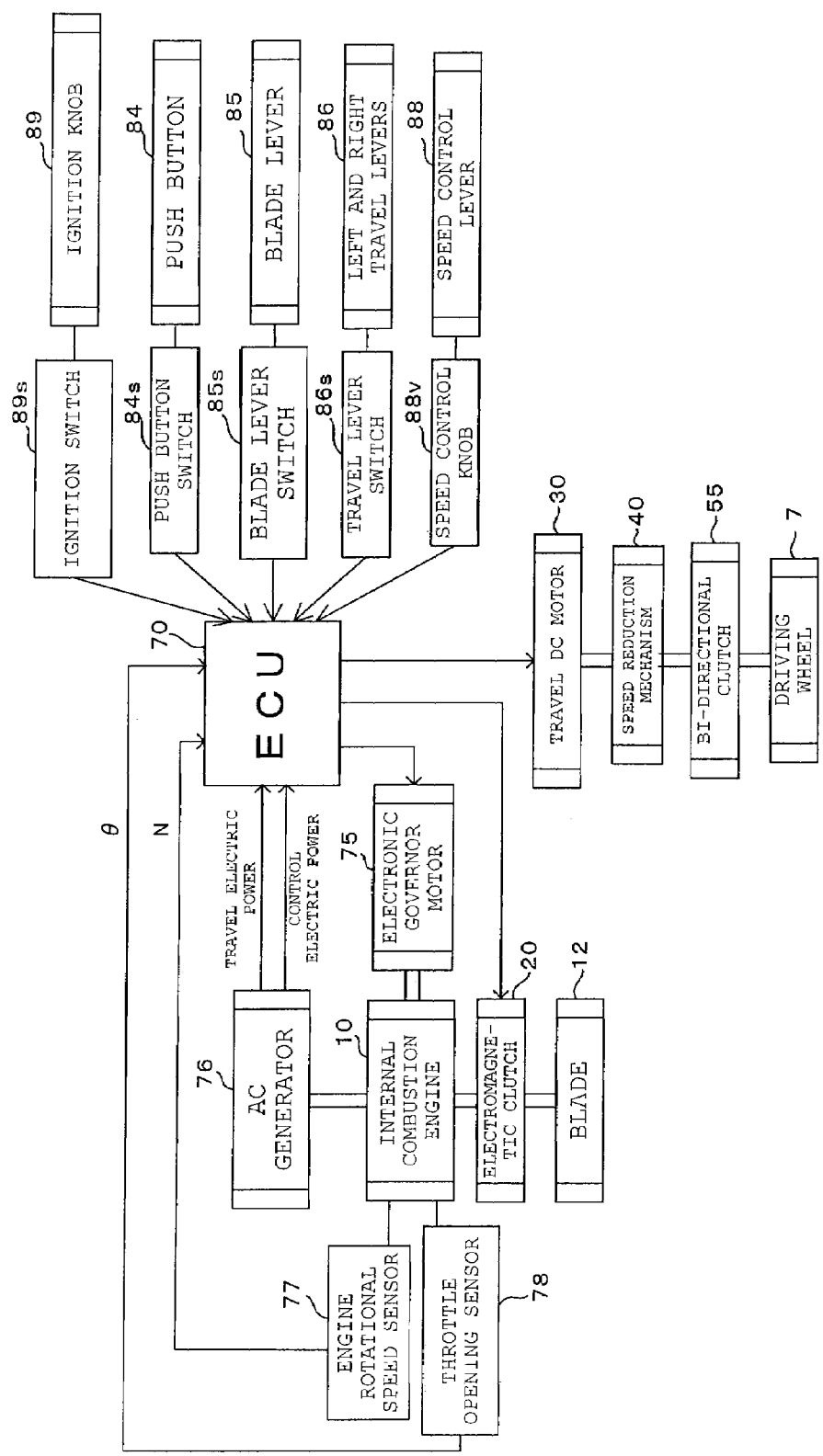
FIG. 9 is a schematic block diagram of a control system of the lawn mower.

As shown in FIG. 9, a push button switch 84s, a blade lever switch 85s, a travel lever switch 86s, a speed control knob 88v, and an ignition switch 89s are provided which are operated by the push button 84, the blade lever 85, the travel lever 86, the speed control lever 88, and the ignition knob 89. Signals from the push button switch 84s, the blade lever switch 85s, the travel lever switch 86s, the speed control knob 88v, and the ignition switch 89s are input to the ECU 70.

A schematic block diagram of a control system of the lawn mower 1 is shown in FIG. 9.

The internal combustion engine 10 is provided with an electronic governor mechanism for controlling an engine rotational speed, and the ECU 70 controls an electronic governor motor 75 for driving a throttle valve of the internal combustion engine 10.

The ECU 70 controls the operation of the electromagnetic clutch 20 and the travel DC motor 30.

The internal combustion engine 10 is provided with an AC generator 76, which generates electric current by using the rotation of the crankshaft 11. Travel electric power generated by the AC generator 76 is supplied to the travel DC motor 30, so that the lawn mower travels. Further, electric power for control generated by the AC generator 76 is supplied to the control system such as the electronic governor motor 75 and the ECU 70.

The ECU 70 is provided with an engine rotational speed sensor 77, which detects the operating condition of the internal combustion engine 10, and a throttle opening sensor 78m for controlling the operation of the internal combustion engine 10 and the travel DC motor 30. Data signals of the engine rotational speed detected by the engine rotational speed sensor 77 and the throttle opening detected by the throttle opening sensor 78 are input to the ECU 70.

When the ignition knob 89 is operated, the ignition switch 89s is turned on. When the travel lever 86 is operated to swing toward the front side of the grip part 82, the travel lever switch 86s is turned on. Accordingly, travel electric power generated by the AC generator 76 is supplied to the travel DC motor 30 and the travel DC motor thus begins to be operated. As a result, the lawn mower begins to travel.

If the blade lever 85 is operated to swing toward the rear side of the grip part 82 after the push button 84 is depressed, the push button switch 84s and the blade lever switch 85s are sequentially turned on. In this case, current is supplied to the electromagnetic clutch 20 and the electromagnetic coil 24 is energized. Accordingly, the clutch is brought into the engagement state and the blades 12 rotate. Thus the operator can perform the mowing operation.

If the push button 84 is not depressed, even though the blade lever 85 is operated to swing, the blades 12 will not rotate. For this reason, it is not possible to perform the mowing operation.

The internal structure of the first operating switch case 83 will be described with reference to FIGS. 10 and 11.

The swing central shaft 100, to which the base ends of the swingable left and right travel levers 86 and 86 are fitted, are rotatably supported by bearings 101 and 101 provided on the inner surfaces of the left and right sidewalls of the first operating switch case 83.

A gear boss 102a is fixedly fitted on the swing central shaft 100, and a driving gear 102 is formed on a part of the gear boss 102a.

An engaging portion 102a protrudes from the gear boss 102a. Further, a torsion spring 103 has its one end engaged with the engaging portion 102a and is wound around the gear boss 102a, and the other end of the torsion spring 103 is engaged with an engaging piece 83b of the first operating switch case 83. Accordingly, the left and right travel levers 86 and 86 are urged via the swing central shaft 100 in a rotational direction in which the travel levers 86 and 86 are moved away from the grip part 82.

Figure 11:
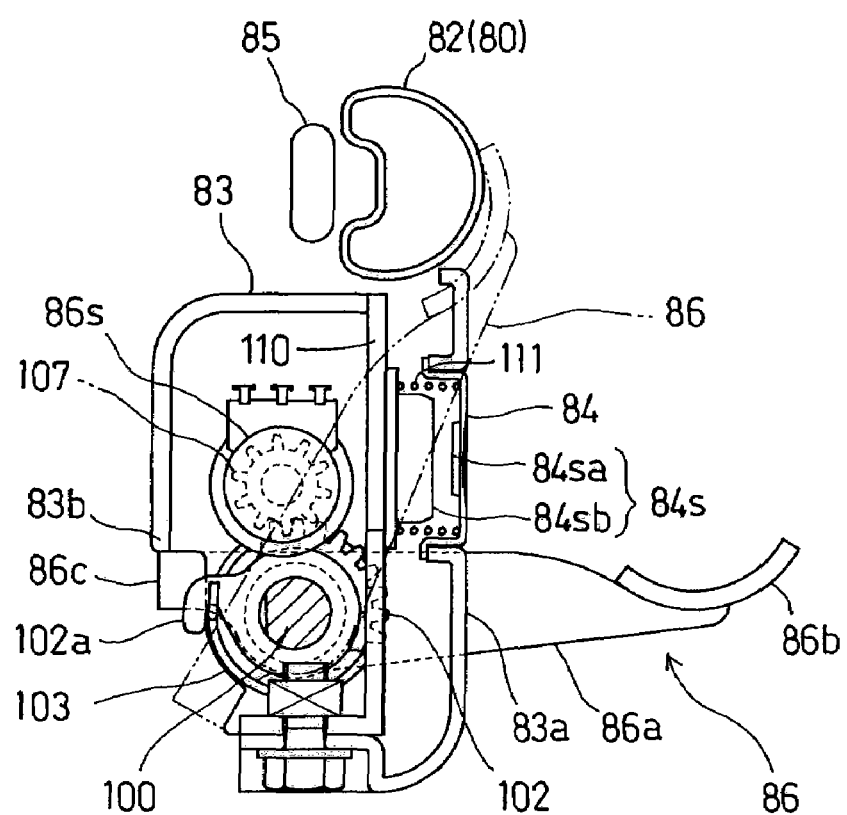
FIG. 11 is a cross-sectional view taken along line XI-XI of FIG. 10.

Referring to FIG. 11, a protrusion 86c, which protrudes from the base end of the swing arm 86a of the travel lever 86, is in contact with an abutment portion 83b of the first operating switch case 83. Thus, the travel lever 86, which is urged by the torsion spring 103, stays at a position (see a solid line in FIG. 11) where the travel lever 86 has swung rearward by about 60° from a position (see a two-dot chain line in FIG. 11) where the travel lever 86 comes in contact with the grip part 82.

The travel lever 86, which has swung rearward and is separated from the grip part 82 of the operation handle 80, is positioned in the range where operator's fingers reach the operation portion 86b of the travel lever 86 while the operator grasps the grip part 82.

The travel lever switch 86s as a potentiometer is disposed in the first operating switch case 83 at a position above the swing central shaft 100, with an operating shaft 106 of the travel lever switch 86s lying in parallel with the swing central shaft 100. The operating shaft 106 extends to the right side. A driven gear 107 fitted to the right end of the operating shaft 106 is engaged with a driving gear 102 of the swing central shaft 100.

Accordingly, when external forces are not applied to the left and right travel levers 86 and 86, the left and right travel levers 86 and 86 are separated rearward from the grip part 82 due to the elastic force of the torsion spring 103. When at least one of the left and right travel levers 86 and 86 is operated to swing forward against the force of the torsion spring 103, the torque of the swing central shaft 100 integrally fixed to the left and right travel levers 86 and 86 rotates the operating shaft 106 through the engagement between the driving gear 102 and the driven gear 107, whereby the travel lever switch 86s is operated. Accordingly, it is possible to detect the operation of the travel lever 86.

An interior plate 110 is provided in the first operating switch case 83 to extend parallel to the rear wall 83a of the first operating switch case 83 so that a gap is formed between the rear wall 83a and the interior plate 110. The push button switch 84s is provided between the interior plate 110 and the rear wall 83a.

That is, the push button 84 is fitted into a circular hole formed in the rear wall 83a while being urged by a spring 111, and a contact 84sa attached to the backside of the push button 84 faces a contact 84sb protruding from the interior plate 110. When the push button 84 is depressed, the contact 84sa comes in contact with the contact 84sb. Accordingly, the push button switch 84s is turned on.

Meanwhile, the blade lever 85, which swings on the front side of the grip part 82 of the operation handle 80, has the same shape as the grip part 82. Further, both left and right ends of the blade lever 85 form short levers 85a and 85a. The short levers 85a and 85a are fitted to coaxial pivots 120 and 120 on the inner surfaces of the left and right long handgrips 81L and 81R of the operation handle 80 so as to be swingably supported.

Referring to FIG. 12, the right handgrip 85a of the blade lever 85 is inserted into the second operating switch case 87, and the pivot 120 for supporting the lever 85a is provided in the second operating switch case 87. The blade lever 85 is urged forward via the pivot 120 away from the grip part 82 by a torsion spring (not shown) around the pivot 120.

A switch operating arm 121 extends forward. The base end of the switch operating arm 121 is fitted to the pivot 120.

The blade lever switch 85s is provided in the second operating switch case 87, and is operated by swinging motion of an operating portion 121a formed at the front end of the switch operating arm 121.

Referring to FIG. 12, when an external force is not applied, the blade lever 85 is separated forward from the grip part 82 of the operation handle 80 as shown by a two-dot chain line and the switch operating arm 121 swings downward, so that the blade lever switch 85s is turned off.

The blade lever 85, which is separated forward from the grip part 82 of the operation handle 80, is positioned in the range where operator's fingers can reach while the operator is grasping the grip part 82.

When the blade lever 85 is operated to swing rearward against the elastic force of the torsion spring in this state, the blade lever 85 is brought into contact with the grip part 82 as shown by a solid line and the switch operating arm 121 swings upward. As a result, the blade lever switch 85s is turned on.

Although not shown in FIG. 12, a speed control knob 88v operable by the operation of the speed control lever 88 and an ignition switch 89s operable by the ignition knob 89 are provided in the second operating switch case 87.

As described above, according to the drive-operating mechanism for the lawn mower 1, the push button 84 as a first operation member is provided on the rear side of the first operating switch case 83 suspended from the central portion of the grip part 82 of the operation handle 80, and the blade lever 85 as a second operation member is provided on the front side of the grip part 82 so as to be movable toward and away from the grip part. Accordingly, while grasping the grip part 82 of the operation handle 80 with one's both hands, the operator can operate the push button 84 provided near the central portion of the grip part 82 with a thumb of any one of right and left hands in order to turn on the push button switch 84s. Subsequently, the operator can grasp the grip part 82 and the blade lever 85 provided on the front side of the grip part 82 in order to turn on the blade lever switch 85s. In addition, while grasping the grip part 82 of the operation handle 80 with both hands, the operator can sequentially operate the push button 84 and the blade lever 85 and engage the electromagnetic clutch 20 in order to rotate the blade 12. As a result, it is possible to perform the mowing operation.

In this way, it is possible to efficiently perform two kinds of successive operation, which are required to perform the mowing operation, and to obtain excellent operability.

It is possible for the operator to constantly operate the operation members while grasping the grip part 82 of the operation handle 80 with both hands. Accordingly, it is possible for the operator to easily operate the lawn mower and to obtain excellent operability. Further, it is possible to constantly keep the lawn mower 1 stable irrespective of the condition of the lawn mower 1 including a condition immediately after the start of the mowing operation.

Since the push button 84 is provided adjacent to the central portion of the grip part 82 of the operation handle 80, it is possible to obtain excellent operator's visibility and to quickly perform the operation while grasping the grip part 82.

The left and right travel levers 86 and 86 are provided on left and right (both) sides of the first operating switch case 83 including the push button 84. Further, the left and right travel levers 86 and 86 are provided close to the push button 84 on left and right sides of the push button so as to be movable toward and away from the grip part 82 toward the rear side of the grip part 82 of the operation handle 80. Accordingly, while grasping the grip part 82 of the operation handle 80 with both hands, the operator can operate at least one of the left and right travel levers 86 and 86 and grasps the travel lever together with the grip part in order to turn on the travel lever switch 86s. For this reason, it is possible to drive the travel DC motor 30 so that the lawn mower travels. Further, while keeping the lawn mower 1 stable, it is possible for the operator to manage the travel operation and to obtain excellent operability.

What is claimed is:

1. A drive-operating mechanism for a lawn mower having a body and an operation handle and driven by one of an electric motor and an internal combustion engine, the body of the lawn mower being supported by wheels, and the operation handle including left and right long handgrips extending rearward from the body of the lawn mower, and a grip part connecting rear ends of the left and right long handgrips, said grip part being adapted to be grasped at side portions thereof by the two hands of an operator, wherein the drive-operating mechanism comprises:

a first operating switch case provided adjacent to and below a central portion, between said side portions, of the grip part of the operation handle, said first operating switch case comprising a first operation member, which is a thumb operable first operating switch located in a range in which a thumb of any one of the hands of the operator grasping the side portions of the grip part can reach to operate the first operation member;

a second operation member swingably supported by the operation handle and provided on a front side of the grip part so as to be movable toward and away from the grip part, said second operation member being located in a range in which the fingers of the operator grasping the side portions of the grip part can reach to operate the second operation member;

a second operating switch case, supported by only one of the long handgrips, adapted to be operable depending on movement of the second operation member;

wherein the first operation member and second operation member are reachable for sequential operation to drive the lawn mower while the operator is grasping the side portions of the grip part.

2. The drive-operating mechanism according to claim 1, wherein:

left and right travel levers are provided adjacent to left and right sides of the first operating switch case, respectively, and the left and right travel levers are disposed on a rear side of the grip part so as to be movable toward and away from the grip part.

3. The drive-operating mechanism according to claim 1, wherein said first operating switch case is fixed to the grip part so as to be suspended downward from the grip part, and wherein said first operating member is a push button provided on a rear side of the first operating switch case.

4. The drive-operating mechanism according to claim 1, wherein:

the first operation member is an operation member for causing the mower to travel.

5. The drive-operating mechanism according to claim 1, wherein:

the second operation member is an operation member for controlling mowing blades of the lawn mower.

6. The drive-operating mechanism according to claim 5, wherein:

the second operation member is a lever having a shape extending along the grip part.

\* \* \* \* \*